United States Patent
Hisatomi et al.

(10) Patent No.: US 7,110,649 B2
(45) Date of Patent: Sep. 19, 2006

(54) FRESNEL ZONED MICROSTRUCTURED FIBRE AND LENS

(75) Inventors: Makiko Hisatomi, Ipswich (GB); Michael Charles Parker, Colchester (GB); Stuart Douglas Walker, Colchester (GB)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 10/887,114

(22) Filed: Jul. 8, 2004

(65) Prior Publication Data

US 2005/0031262 A1 Feb. 10, 2005

(30) Foreign Application Priority Data

Jul. 11, 2003 (GB) .................................. 316306.0

(51) Int. Cl.
*G02B 6/20* (2006.01)
(52) U.S. Cl. ........................ 385/125; 385/123; 385/124
(58) Field of Classification Search ........ 385/123–128, 385/142
See application file for complete search history.

(56) References Cited

U.S. PATENT DOCUMENTS

| 5,243,618 | A | 9/1993 | Dolezal et al. | 372/92 |
| 5,613,027 | A | 3/1997 | Bhagavatula | 385/123 |
| 6,556,756 | B1 * | 4/2003 | Bhagavatula | 385/123 |
| 6,573,813 | B1 | 6/2003 | Joannopoulos et al. | 333/342 |
| 2002/0001445 | A1 | 1/2002 | Hasegawa et al. | 385/125 |
| 2002/0094181 | A1 | 7/2002 | Bhagavatula | 385/123 |
| 2002/0191929 | A1 | 12/2002 | Fink et al. | 385/127 |
| 2003/0031407 | A1 | 2/2003 | Weisberg et al. | 385/28 |

FOREIGN PATENT DOCUMENTS

| EP | 1 028 327 A1 | 8/2000 |
| EP | 1 037 074 A1 | 9/2000 |
| WO | WO 03/038494 | 5/2002 |
| WO | WO/02/057820 A1 | 7/2002 |
| WO | WO/03/050571 | 6/2003 |

OTHER PUBLICATIONS

European Search Report, Application No. EP 04 25 4121, Jun. 9, 2005.
Yeh, Pochi, "Optical Waves in Layered Media," Rockwell International Science Center, XP-002322796, Wiley & Sons, pp. 166-195, 1988.
Ibanescu et al., "Analysis of Mode Structure in Hollow Dielectric Waveguide Fibers," Physical Review, E (Statistical, Nonlinear and Soft Matter Physics, APS through USA, vol. 67, No. 4, Apr. 17, 2003 pp. 1-8.

* cited by examiner

*Primary Examiner*—Phan Palmer
(74) *Attorney, Agent, or Firm*—Baker Botts L.L.P.

(57) ABSTRACT

A fresenel zoned microstructured optical fiber is described. The fiber is constructed of concentric zones, each zone being defined by discontinuities in the refractive index. The refractive index within each zone may either be constant or may vary, for example each zone being a section of a parabola or hyperbola. The fiber may be used as a lens, for example for coupling light between fibers with different core sizes.

57 Claims, 11 Drawing Sheets

US 7,110,649 B2

FRESNEL ZONED MICROSTRUCTURED FIBRE AND LENS

CROSS REFERENCE TO RELATED APPLICATIONS

This application claims priority, in part, under 35 U.S.C. §119 to British application serial number GB0316306.0 filed Jul. 11, 2003 and entitled "FRESNEL ZONED MICROSTRUCTURED FIBER AND LENS."

TECHNICAL FIELD OF THE INVENTION

The present invention relates to a microstructure for an optic fibre and a similar structure for a lens.

BACKGROUND OF THE INVENTION

Optic fibres are used to guide light over meters to many kilometers. They work by confining the light to a central core. Examples of known structures for optic fibres are briefly described below.

In the commonly used single mode optic fibre, the core that carries the light is surrounded by a layer of cladding, as may be seen in FIG. 1a. Both the core and cladding are typically glass but the core is made of a high refractive index material whilst the cladding has a lower refractive index, so that light in the core undergoes total internal reflection at the interface between the two layers and so is confined to the core. FIG. 1b is an example of the refractive index variation.

In recent years, photonic waveguiding structures have been proposed, such as the so-called "OmniGuide" fibre (see FIG. 2), which has been described at M. Ibanescu et al, *Physical Review E*, Vol. 67(4), article number 046608, 2003. In this, alternate concentric layers of high and low refractive index surround a core, the structure being periodic in the radius. The periodicity acts as a bandgap to exclude certain wavelengths and thus confine them to the core.

Another proposal has been to radially grade the refractive index from a high value at the centre of the fibre to a low value. This serves to refract the light rays at the boundary between each layer (which can be considered infinitesimally thin if the refractive index variation is continuous). This serves to bend rays on trajectories away from the axis of the fibre back towards that axis. A graded index or "GRIN" fibre is illustrated in FIG. 3a. Typically, the refractive index variation is parabolic as shown in FIG. 3b.

Another problem that has been under consideration in the area of photonics is the coupling of light between waveguides of different width. Single mode glass optic fibres and also polymer waveguides have relatively low refractive index, making the core width relatively large (to obtain the single mode operation), whereas silicon waveguides (silicon being used because photonic devices are often manufactured in silicon) have a relatively high refractive index, and so have a relatively small waveguide width. There is, therefore, a difficulty in efficiently transferring light from optic fibres and polymer waveguides into silicon waveguides.

FIG. 4 shows one proposal to overcome this. Instead of simply abutting the end of, in this example a polymer waveguide to the end of a silicon waveguide, a tapered section of the silicon waveguide is extended into the polymer core over some distance. The taper collects more of the light from the polymer core and transmits it into the silicon core. The device is further described at T Shoji et al, *15th LEOS Conf. Proc.*, Vol. 1, TuU3, p289–290, 2002.

Another proposal is to use a short section of graded index fibre as a lens to concentrate light from the wide exit aperture of the fibre or polymer waveguide into the smaller aperture at the end of the silicon waveguide. The action of such a lens is illustrated in FIG. 5, which shows the rays from the wide glass optic fibre aperture being converged by the index variation to a focus, which is where the input aperture to the silicon waveguide is placed.

SUMMARY OF THE INVENTION

The present invention provides a new structure for confining light to the core of an optic fibre. The structure is also useful for making a lens.

According to one embodiment of the present invention, an optical device having an optic axis along which light propagates includes an optical material having a refractive index that changes continuously with distance from the optic axis except for at one or more discontinuities dividing the device into a plurality of zones.

According to another embodiment of the present invention, an optical device having an optic axis along which light propagates includes an optical material having a number of discontinuities in the refractive index of the optical material that divide the device into a plurality of zones. Furthermore, if the zones are consecutively numbered from the optic axis with a zone number (m) such that a central zone bounded by a first discontinuity nearest the optic axis has a zone number equal to 1, the distance of a second and any other discontinuities from the optic axis is a distance of the first discontinuity from the optic axis times the square root of the zone number of the zone for which the second or other discontinuity forms an outer boundary.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

Examples of the present invention will now be described with reference to the accompanying drawings, of which:

FIG. 1b is a graph of the refractive index variation with radius of the structure of FIG. 1a;

FIG. 3b is a graph of the refractive index variation with radius of the structure of FIG. 3a;

FIG. 6b is a graph of the refractive index profile of the lens of FIG. 6a;

FIG. 7c is a magnified view of part of FIG. 7a;

FIG. 9b is a graph of the refractive index profile of the lens of FIG. 9a;

FIG. 10c is a magnified view of part of FIG. 10a;

DETAILED DESCRIPTION OF THE DRAWINGS

Figure 1A:
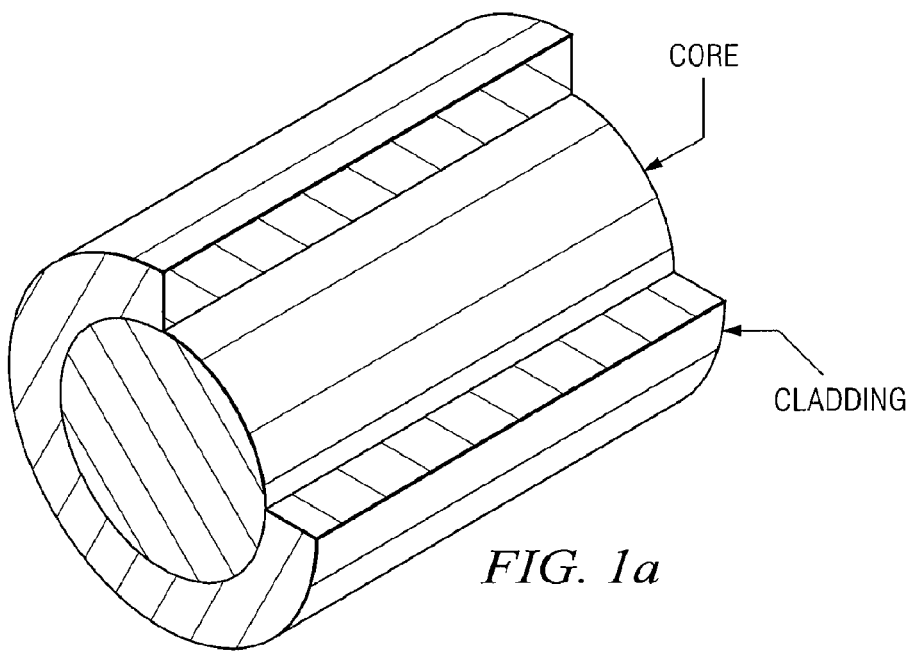
FIG. 1a shows a portion of a known single mode optic fibre.
Figure 1B:
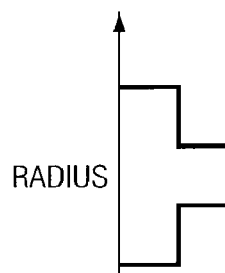
Figure 2:
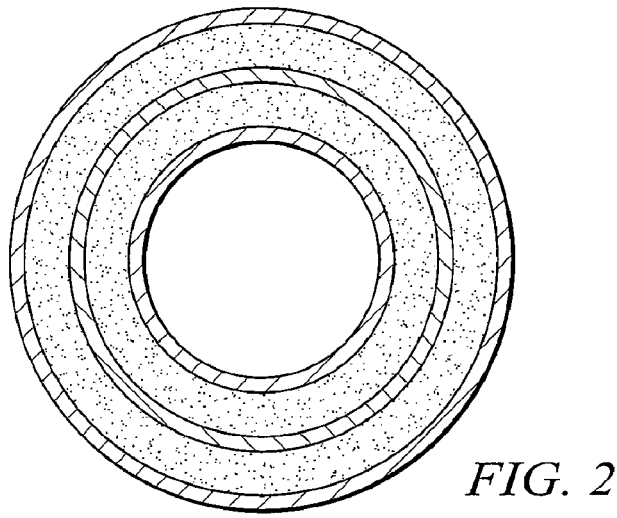
FIG. 2 shows a cross section of a known microstructured optic fibre.
Figure 3A:
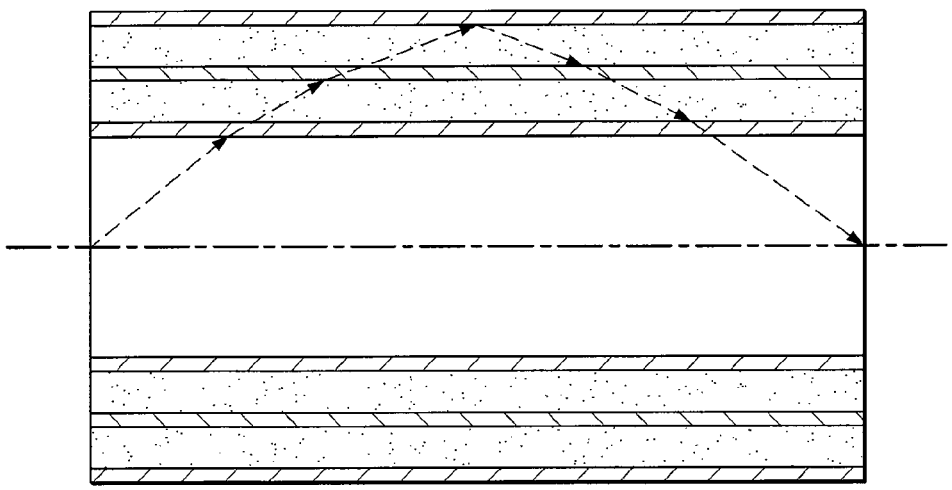
FIG. 3a shows a portion of a graded index optic fibre.
Figure 3B:
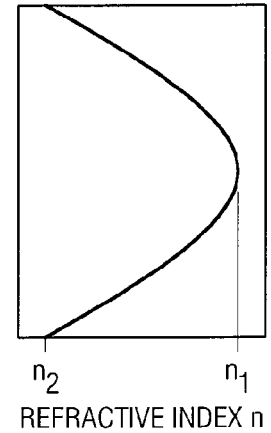
Figure 4:
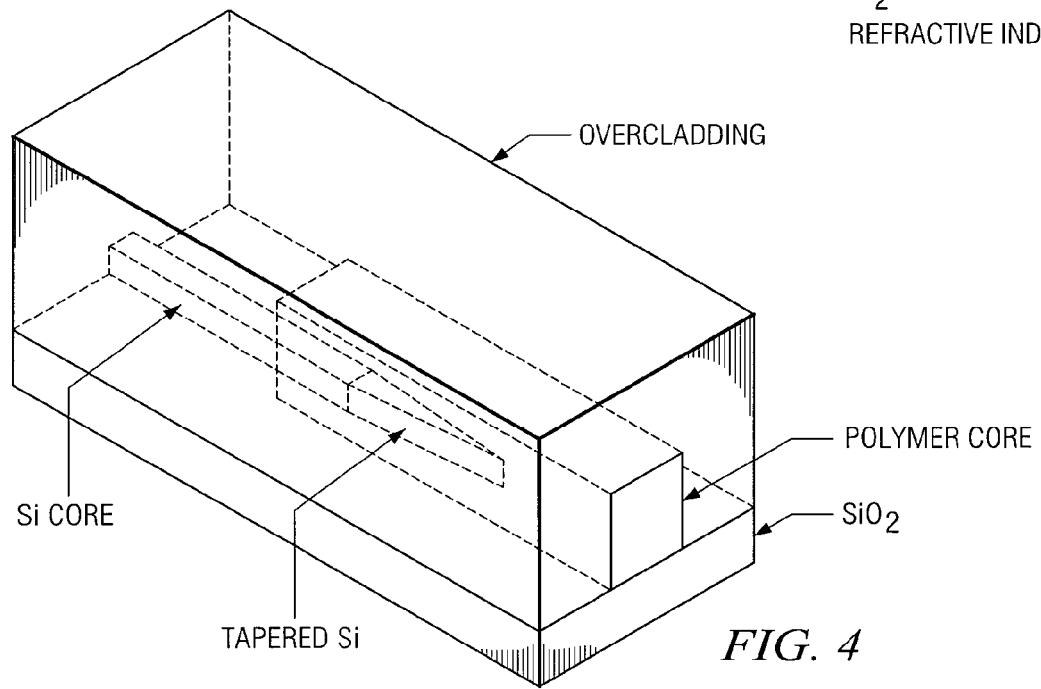
FIG. 4 shows a known tapered spot size converter.
Figure 5:
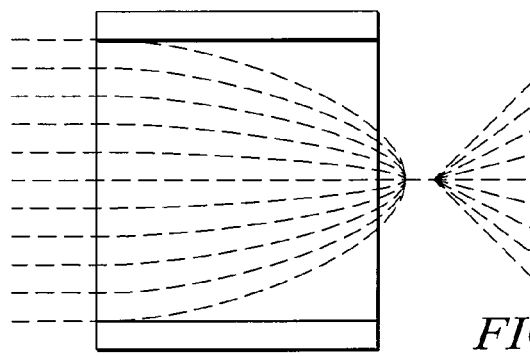
FIG. 5 shows a known graded index lens.
Figure 6A:
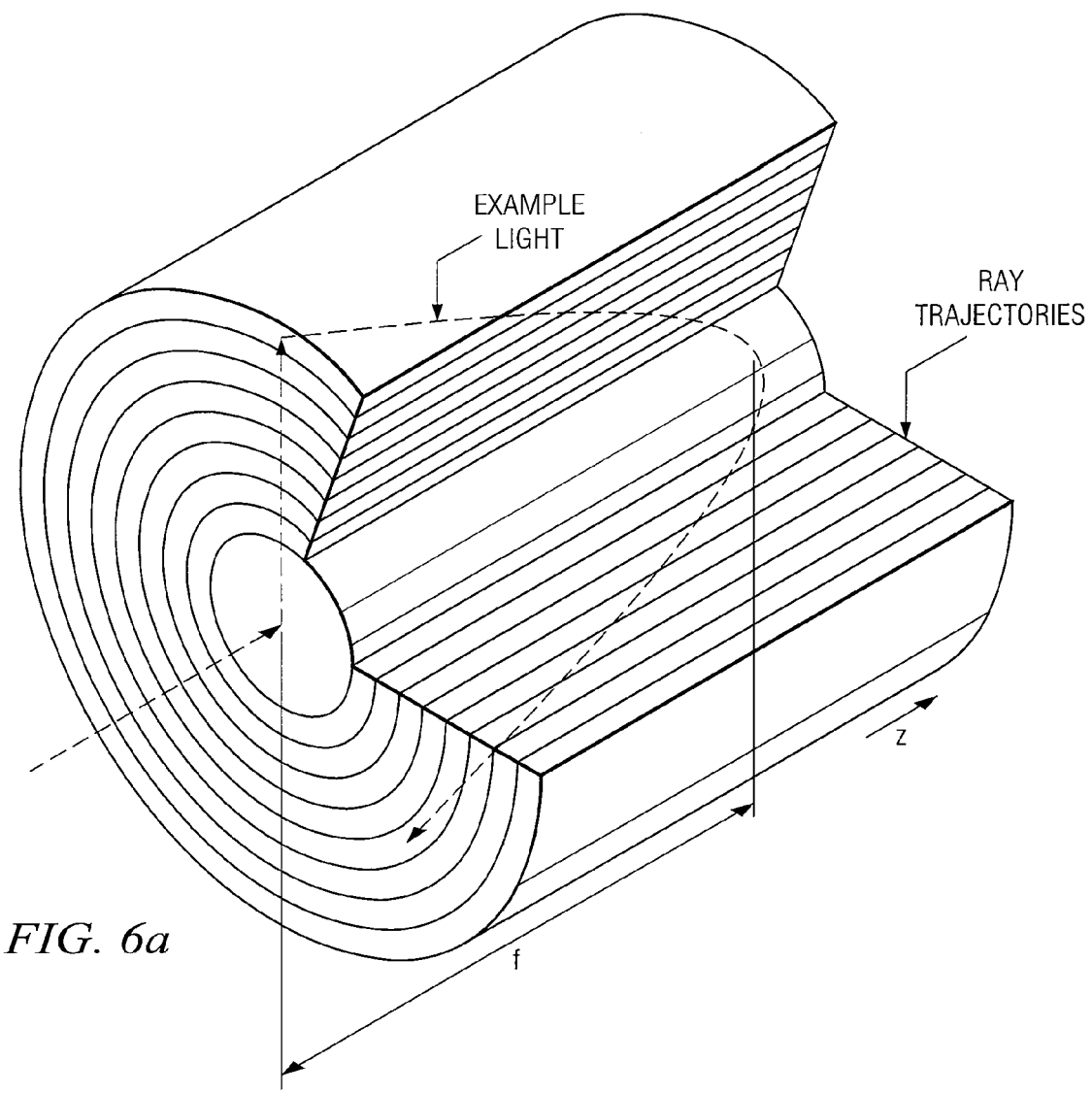
FIG. 6a shows a zoned microstructured fibre lens according to the invention.

FIG. 6a shows one particular example of a zoned microstructured fibre lens according to the present invention. The lens comprises a number of concentric cylinders, or "zones" of optical material. Within each zone the refractive index is graded from a value of 2.5 at its inner radius to a value of 2.1 at its outer radius. The gradation follows a segment of a parabola. At the junction of two zones the refractive index changes between 2.1 and 2.5 discontinuously. (As will become clear these two values, and some further parameters as well, can be changed.)

Figure 6B:
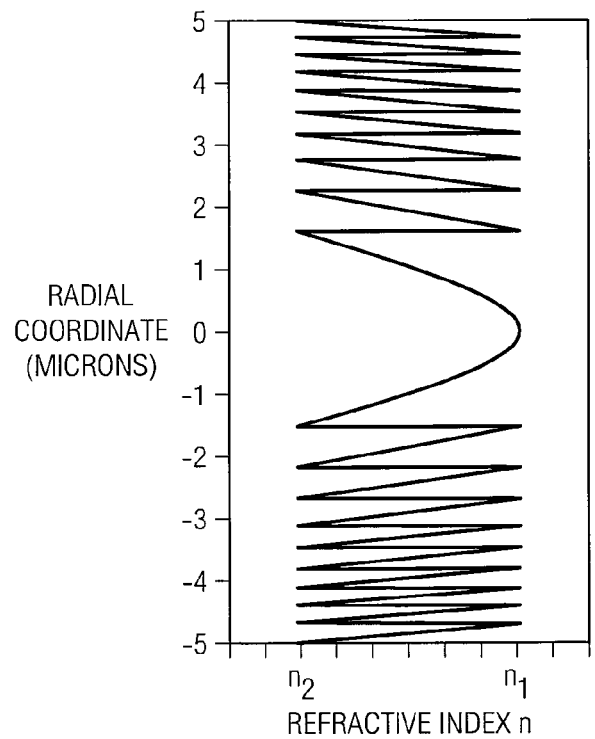

The refractive index variation with radius is shown in FIG. 6b and is given by equations 1, 1a and 1b below. The radii of the zones are given by equation 2.

$$n_m(r) = n_1 - \frac{(n_1 - n'_m(r))(n_1 - n_2)N}{n_1 \Delta} \quad (1)$$

$$n'_m(r) = n_1(1 - \Delta r^2) + \frac{(m-1)n_1\Delta}{N}, \quad \Delta = \frac{n_1^2 - n_2^2}{2n_1^2} \quad (1a, 1b)$$

where $n_m(r)$ is the refractive index variation within the $m^{th}$ zone (with $n_1$ being the upper value at each discontinuity and $n_2$ being the lower), r is the radius of a particular point, N is the total number of zones, m is the number of the particular zone associated with the radius r (the zones being numbered consecutively and the central zone having m=1), and $r_N$ is the outer radius of the outermost zone.

From equation 1, and the constraint (in this example) that $n_1$ and $n_2$ are the same for each zone, it follows that:

$$r_m = \sqrt{m} r_1 \quad (2)$$

where $r_m$ is the radius of zone m.

In some ways this structure is reminiscent of the Fresnel zone plate, which of course is a plate having a number of concentric zones. As will be seen below the zoned structure of the invention has a focussing property, as does the Fresnel zone plate, and also the Fresnel zone plate has a square root variation for the radii of its zones, which this particular example of the invention having the parabolic refractive index variation does as well (see equation 2). Based on these similarities the inventors have decided to call the zoned microstructure of the invention a Fresnel zone microstructure. However the present invention is not a Fresnel zone plate; the Fresnel zone plate diffracts light through its apertures and then the light propagates through free space to its focus, whereas in the present invention light is refracted continuously as it passes through the material of the device.

The usefulness of this structure as an optic fibre waveguide and as a lens can be seen by considering the trajectories of light rays passing through it. Equation 3 is the general equation of a geometric light ray trajectory (i.e. light considered as a particle) through a medium in accordance with the "principle of least time".

$$\frac{d}{dt}\left(n(x)\frac{dx}{dt}\right) = \nabla n(x) \quad (3)$$

where n(x) is the refractive index of the medium at point x in the medium and t is the (scalar) trajectory of the ray. Under the paraxial approximation and in the case of only radial variation of the refractive index this becomes:

$$\frac{d^2 n}{dz^2} = \frac{1}{n(r)}\frac{dn}{dr} \quad (3a)$$

where the symbols are as defined earlier and z is the coordinate along the axis from which r is measured.

Figure 7A:
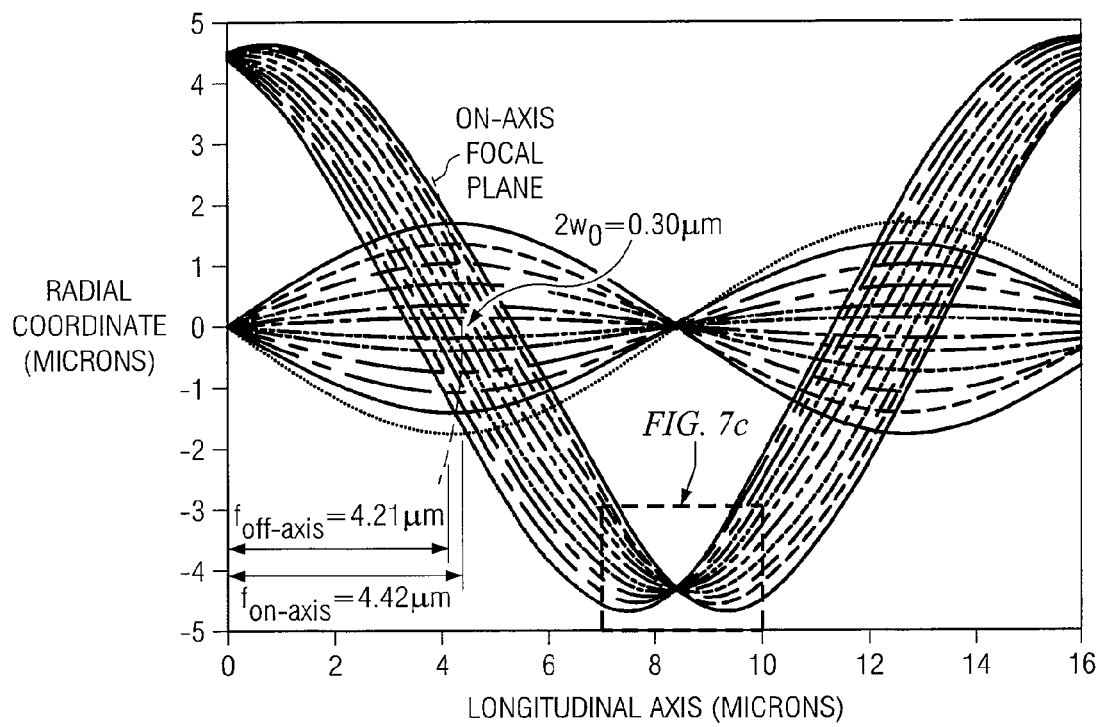
FIG. 7a is a diagram of simulated ray trajectories through the microstructured fibre of FIG. 6.

Solving this equation numerically for the structure of FIG. 6 results in the ray trajectories as shown in FIG. 7a. (The Figure shows rays propagating through a greater length of the structure than is shown in FIG. 6a.) Two sets of rays are shown: one covering a range of angles of injection at a point on the axis of the device and another similar off-axis set injected at 4.5 μm from the axis.

Both sets of rays show paths oscillating about the axis of the device. This oscillation confines light propagating along the device to a region about the axis and so the structure may be used for an optic fibre, i.e. waveguide. (The fibre waveguide using the structure would of course be much longer than the lens shown in FIG. 6a.)

Further, the device will bring rays injected parallel to the axis to a focus on the axis after one quarter of a period. Therefore a section of the structure a quarter of the period long will make a lens having a focal length equal to that length. A use of this, to couple light between optical devices, is given later. Usefully for a lens the period of the sinusoids is very nearly independent of the radius of injection (focal length f=4.42 μm for rays injected on axis and f=4.21 μm for rays injected at 4.5 μm from the axis, so rays parallel to the axis over a wide aperture will be brought to the same focus, with minimal aberration.

Figure 7B:
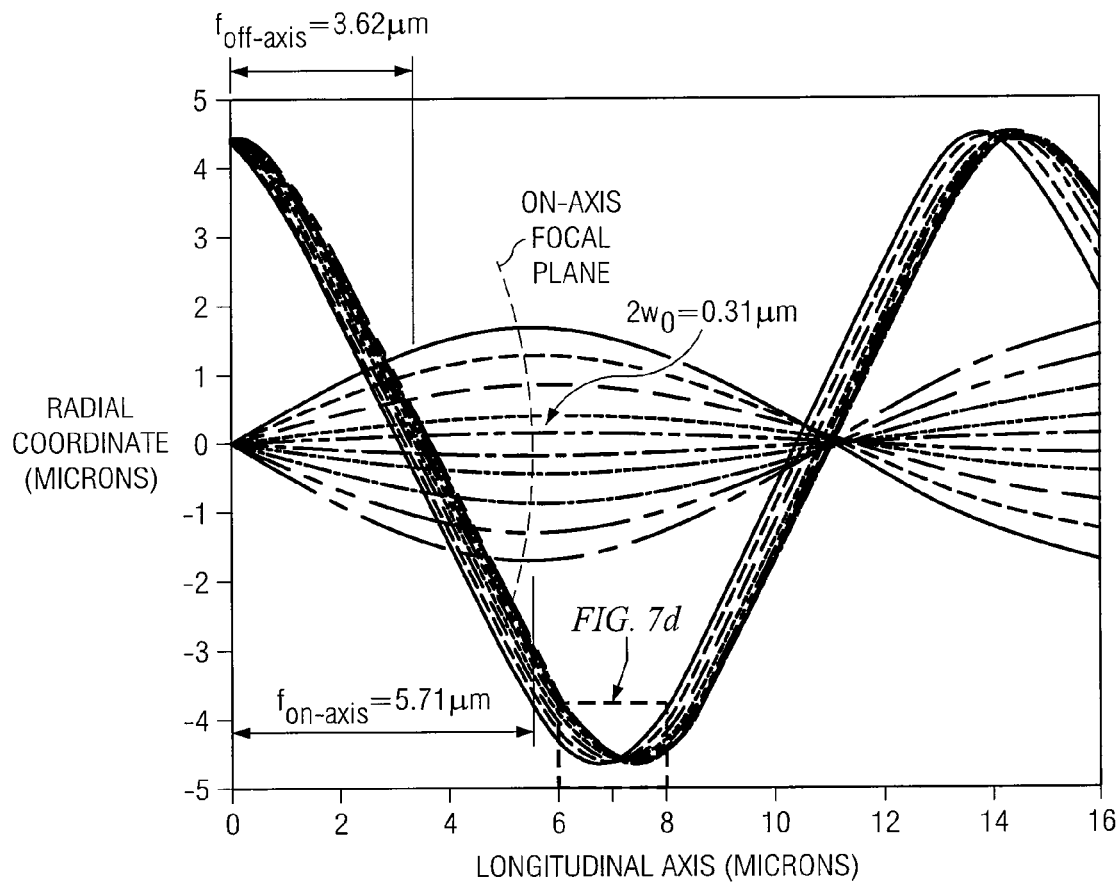
FIG. 7b is a diagram of simulated ray trajectories through an equivalent parabolic graded index structure.

As noted above a simple unzoned rod lens having a refractive index graded with radius according to a parabola has been proposed previously. FIG. 7b shows the calculated ray paths for such lens having the same overall diameter as the zoned example and the refractive index varying form 3.5 as the axis to 1 at the outside, which provides similar focussing power to the zoned example. These ray paths are also sinusoids but rays injected on-axis have a substantially longer period than those injected off-axis and so the focus for rays injected over a wide aperture will be poor.

Figure 7C:
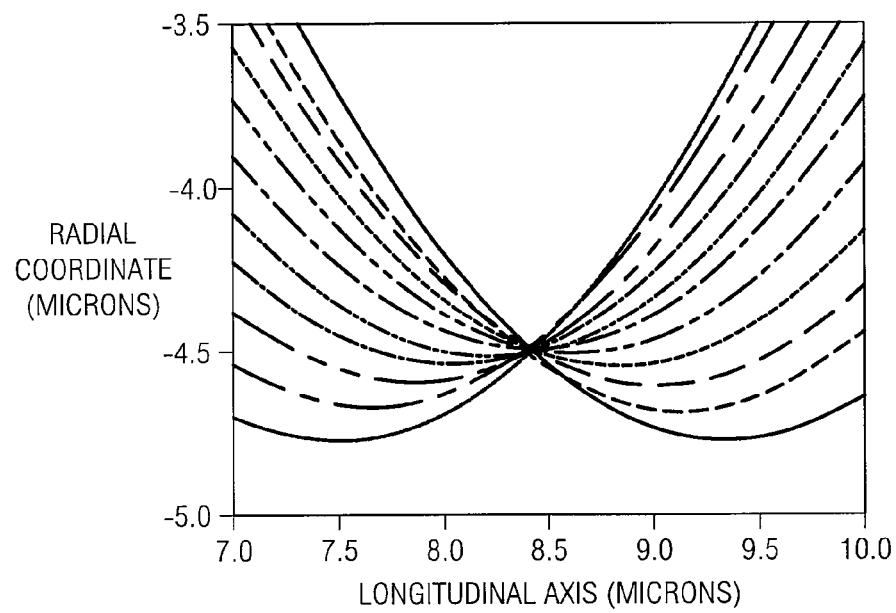
Figure 7D:
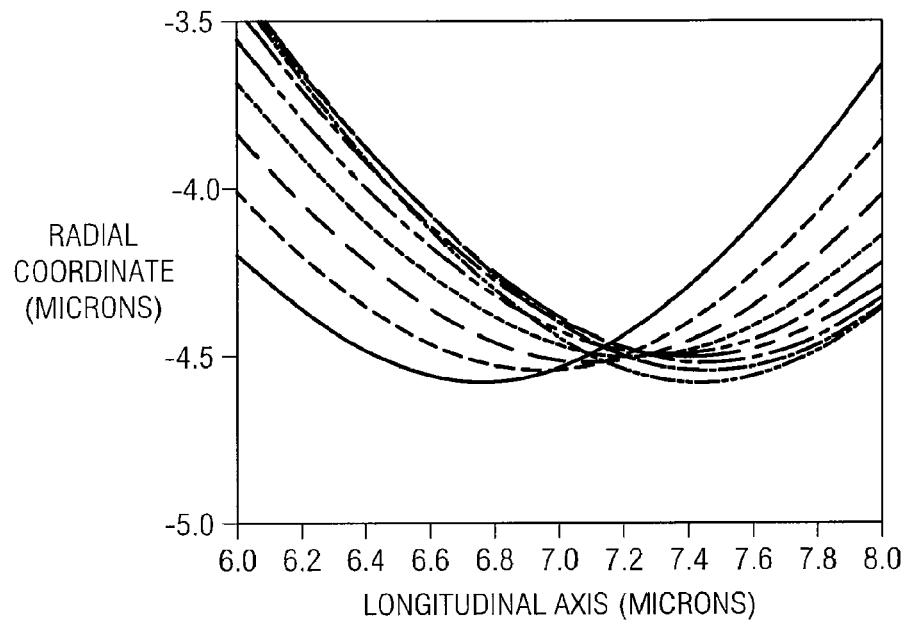
FIG. 7d is a magnified view of part of FIG. 7b.

Also, as FIGS. 7c and 7d show (being enlargements of portions of FIGS. 7a and 7b), the focus for a set of rays injected at the same point but over a range of injection angles is better for the zoned device. Again a tighter focus for the zoned lens is evident and is useful because not all of the light incident on the lens will be at the same angle.

Another notable advantage of the zoned device (whether for use as a lens or an optic fibre waveguide) is that the refractive index needs only to be varied over a narrow range (2.1 to 2.5 is used in this example) compared to the unzoned case (in the comparative unzoned example above the range was 1 to 3.5). Layered optic fibres are usually constructed by assembling a large preform of glass (or other material) of cylinders of the appropriate refractive indexes, and the preform is then drawn into a fibre. If the refractive indexes are very different then very different materials will have to be used, which may well differ in their mechanical and thermal properties, which will make this process of construction difficult. With low index differences such problems are less likely, for example, it may be possible to use one family of materials varying some composition parameter to obtain the variation of refractive index. A lens can be made by drawing a fibre and then taking a short section of that. The section can be in length just a single quarter period of the sinusoidal oscillation but an odd integer multiple of that would also work and may be useful if it is difficult to obtain such a short length or if the devices coupled by the lens are an inappropriate distance apart.

In this example the designer of a fibre or lens has several parameters to determine, namely $n_1$ and $n_2$ (the maximum and minimum refractive indexes), the total number of zones and the total radius of the fibre, although considering equations 1 and 2 these are not all independent.

The period of the sinusoids is not key for the design of an optic fibre, although probably if it is too long it will limit the ability to bend the fibre without loss of the light. For a lens, however, the focal length (and hence the period of the sinusoids) is usually of interest.

Figure 8:
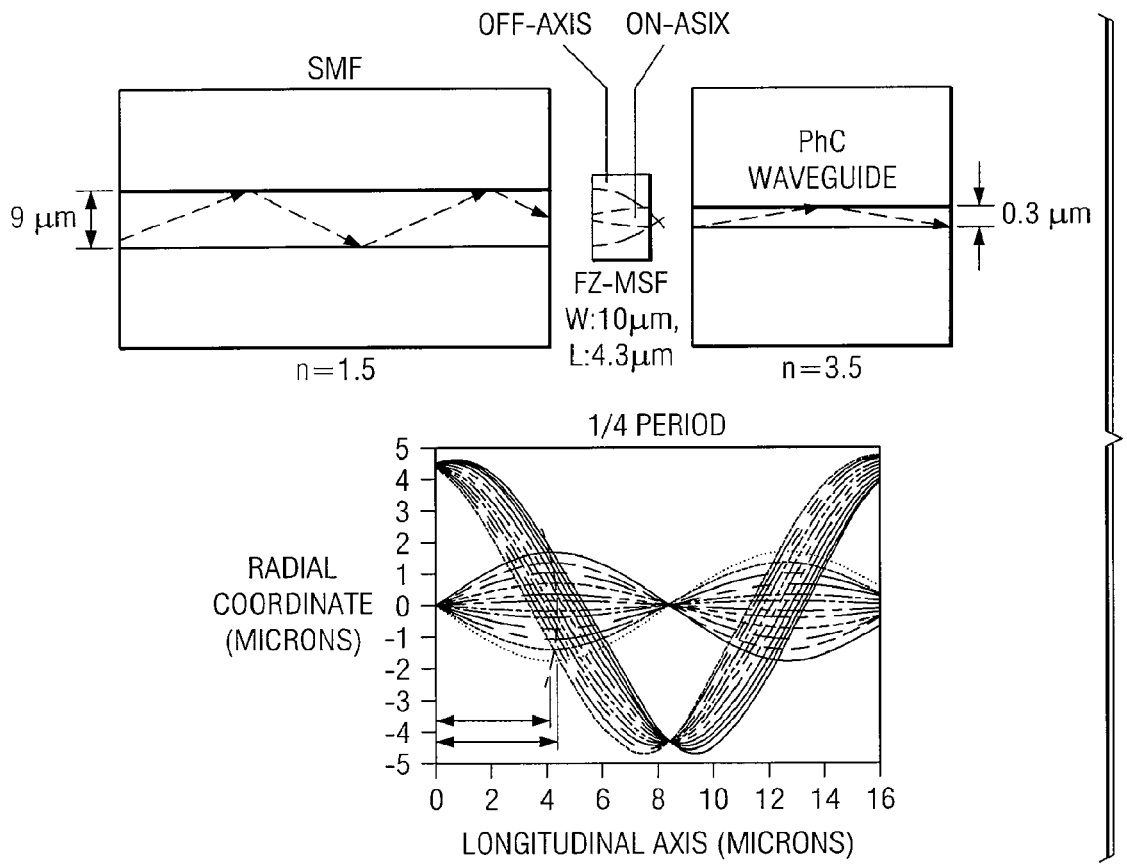
FIG. 8 shows a microstructured lens application.

FIG. 8 shows a possible lens application. A glass single mode fibre (SMF) has typically a core of 9 µm in diameter, whereas a photonic crystal waveguide is, for example, manufactured from silicon; this has a much higher refractive index, and so to be single mode will have a waveguide width of 0.3 µm. Although there are other approaches as noted above, a microstructured zoned lens placed between the two will focus light exiting the broad aperture of the single mode fibre into the smaller aperture of the photonic crystal waveguide and in particular a lens comprised of a quarter period section of the zoned structure (or an odd integer multiple of that length) works well for the reasons noted above, namely the focussing of rays injecting at different r and the good focusing of rays injected at different angles. Further as explained below such a lens provides impedance power matching, i.e. minimal Fresnel reflection back into the single mode fibre (or back into the photonic crystal depending on the direction of operation).

(The dotted rays near the axis in FIG. 7 show the range of angles that would be presented by the single mode fibre. The fibre would inject most of its intensity near the axis but there would still be some intensity injected off-axis so those ray trajectories are also of interest in considering the functioning of the lens.)

In the application of FIG. 8 the focal length is important because it relates the input and output spot sizes. As an approximation, if the lens is taken to be a thin one then the optics of waves limited transversely by a Gaussian function gives the relation:

$$w_0 = \frac{f\lambda}{n_1 \pi a} \quad (4)$$

where f is the focal length, $\lambda$ is the wavelength of the light, $n_1$ is the refractive index as above, a (a measure of the width of the pattern of light incident on the lens) is close in value to the radius of core of the single mode fibre, and $2w_o$ is the width of the aperture of the photonic crystal waveguide. At a wave length of 1.55 µm and using a material system in which $n_1$=2.5, the focal length (i.e. quarter of the sinusoid period) should be in the region of 3.4 µm with which the focal length as shown in the Figure is in broad general agreement.

However, establishing a desired focal length places a constraint on the parameters of the zoned lens. The period of the sinusoid was determined numerically for a particular case but since it is refractive index variation which refracts light rays, and considering equation (1), the parameters to change are $n_1$ and $n_2$ (i.e. the refractive index contrast) and the number of zones (thus changing $r_N$). Also as will be seen later in a discussion of the solutions of equation 3a these can be used to give some indication of the values to use for these.

As mentioned above, the zoned lens matches the power from the single mode fibre into the photonic crystal better than the simple unzoned graded index rod lens. This is because it has an average refractive index of 2.3 ($n_1$ and $n_2$ being 2.5 and 2.1) which is close to the ideal for power matching, which is given by:

$$\sqrt{n_{SMF} n_{PhC}} = 2.29 \quad (5)$$

where typically $n_{SMF}$=1.5 (refractive index of the single mode fibre) and $n_{PhC}$=3.5 (refractive index of the photonic crystal waveguide). Thus the designer of a zoned lens can set the average refractive index in accordance with this impedance property.

In contrast, the equivalent simple unzoned graded index rod lens described above has a wide range of refractive index but for this purpose the value can be taken roughly to be that at the axis (where the light is concentrated), namely 3.5, which is far from the ideal value and significant reflection into the single mode fibre results. It is difficult, however, to make this figure lower because the refractive index at the edge of the fibre is already low, i.e. 1.

Figure 9A:
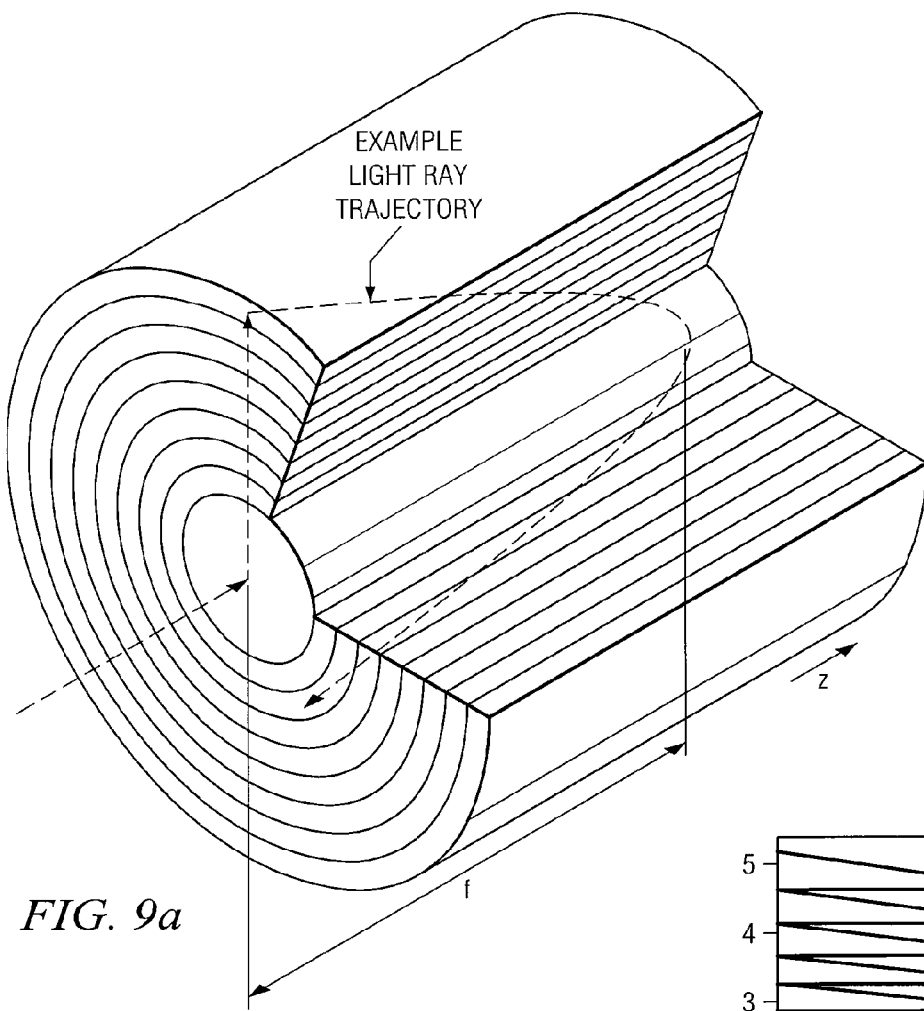
FIG. 9a shows another zoned microstructured fibre lens according to the invention.
Figure 9B:
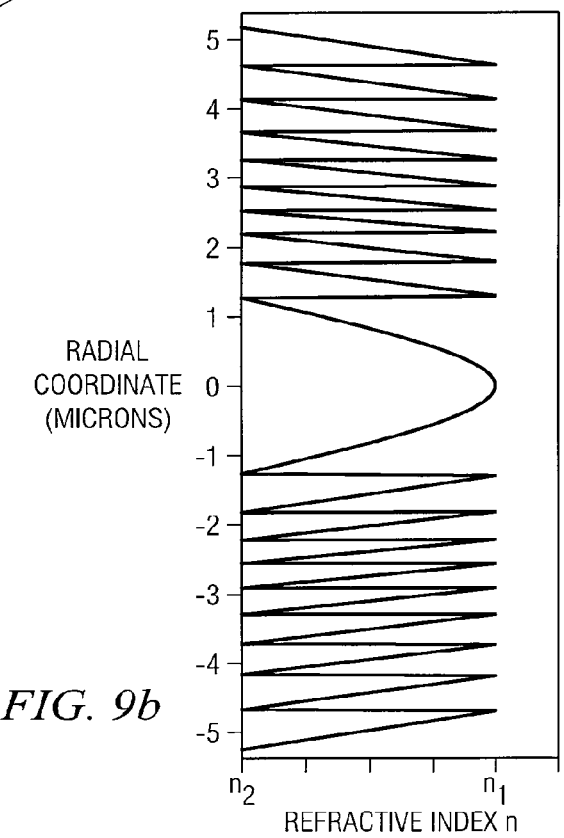

A second example of a zoned optical structure according to the invention is shown in FIGS. 9a and 9b.

Again the structure comprises a number of concentric zones with a discontinuity in refractive index between each zone and a continuous variation of that within each zone. Also again the refractive index at the beginning of all zones is the same and the refractive index at the end of all zones is the same. In this example, however, the refractive index in each zone is a segment of a Gaussian function (again centred on the axis, i.e the form is $exp(-Kr^2)$, where r is the radius from the optic axis). In particular the form of the refractive index is:

$$n_m(r) = n_1 exp(-\kappa_m^2 r^2/2) + \Delta n_m \quad (6)$$

where r is the radius from the optic axis, $n_m(r)$ is the refractive index within the $m^{th}$ zone (the central zone having m=1), $n_1$ is the refractive index on the optic axis, $\kappa_m$ is a constant for each zone determined as explained below and $\Delta n_m$ is a constant for each zone chosen to make the refractive index equal to $n_1$ at the beginning of each zone.

Substituting equation (6) for the central zone m=1 (and $\Delta n_1$=0) into the ray trajectory equation under the paraxial approximation (equation (3a)) leads to the simple harmonic motion equation:

$$\frac{d^2 r}{dz^2} = -\kappa_1^2 r \quad (7)$$

which of course has sinusoidal solutions with spatial frequency $\kappa_1$. Therefore the designer can choose $\kappa_1$ to set the focal length of a lens made with this structure. From equation 6 the value of $\kappa_1$ determines the radius of the first zone for a given $n_2$, the refractive index at that radius, (the latter establishing the refractive index contrast, which can be made advantageously low, and the former being related to the total number of zones in a particular overall size of fibre or lens).

For the next and subsequent zones substituting equation 6 into equation 3a yields the following (the left hand equality):

$$\frac{d^2 r}{dz^2} = \frac{-\kappa_m^2 r}{1 + (\Delta n_m / n_1) \exp(-\kappa_m^2 r / 2)} \approx -\kappa_1^2 r \quad (8)$$

If sinusoidal trajectories of the same period are obtained in all zones then it should be possible to have minimal aberration, because all rays irrespective of their radius or angle of injection will have trajectories of that period. Sinusoids of the same period are obtained if the right hand approximation of equation 8 is true, which in turn is true if:

$$\frac{-\kappa_m^2}{1 + (\Delta n_m / n_1) \exp(-\kappa_m^2 r / 2)} \quad (9)$$

This was evaluated using, as a first approximation, r equal to the radius of the previous zone, i.e. $r_{m-1}$. Once $\kappa_m$ is known for a particular zone it can be used to determine the radius of that zone (so that the refractive index equals $n_2$ (equation (6)), which can then be used to determine $\kappa_m$ for the next zone.

Unfortunately $\kappa_m$ is in both the numerator and in the exponential in the denominator of equation 9, which therefore has to be solved iteratively. Values obtained for the case where $n_1$=2.4 and $n_2$=2.2 and choosing $\kappa_1$ such that the focal length f, or quarter period, =5 μm ($\kappa_1$=π/2f) were as follows:

| Zone m | $\kappa_m$ (μm$^{-1}$) | $r_m$ (μm) |
|---|---|---|
| 1 | 0.3166 | 1.3177 |
| 2 | 0.3404 | 1.8454 |
| 3 | 0.3637 | 2.2521 |
| 4 | 0.4008 | 2.5957 |
| 5 | 0.4008 | 2.9430 |
| 6 | 0.3637 | 3.3285 |
| 7 | 0.3403 | 3.7489 |
| 8 | 0.3166 | 4.2116 |
| 9 | 0.31 | 4.7183 |
| 10 | 0.29 | 5.2862 |

These values give the structure shown in FIG. 9a.

The iteration used converged for the first four zones but did not do so for the 5th zone and so the values of $\kappa_m$ for that and the following zones are sub-optimal choices (the values for zones 5 to 8 simply being the reverse of the values for zones 4 to 1, in view of the appropriate reversal of the curvature of the Gaussian, and then for zones 9 and 10 the value was simply reduced slightly).

It would be possible at each zone, once its outer radius is known to set r in equation 9 to the average radius of the zone and then redetermine $\kappa_m$, and then consequently re-adjust the outer radius of the zone, and so on iteratively, which conceivably might give different or better results.

Figure 10A:
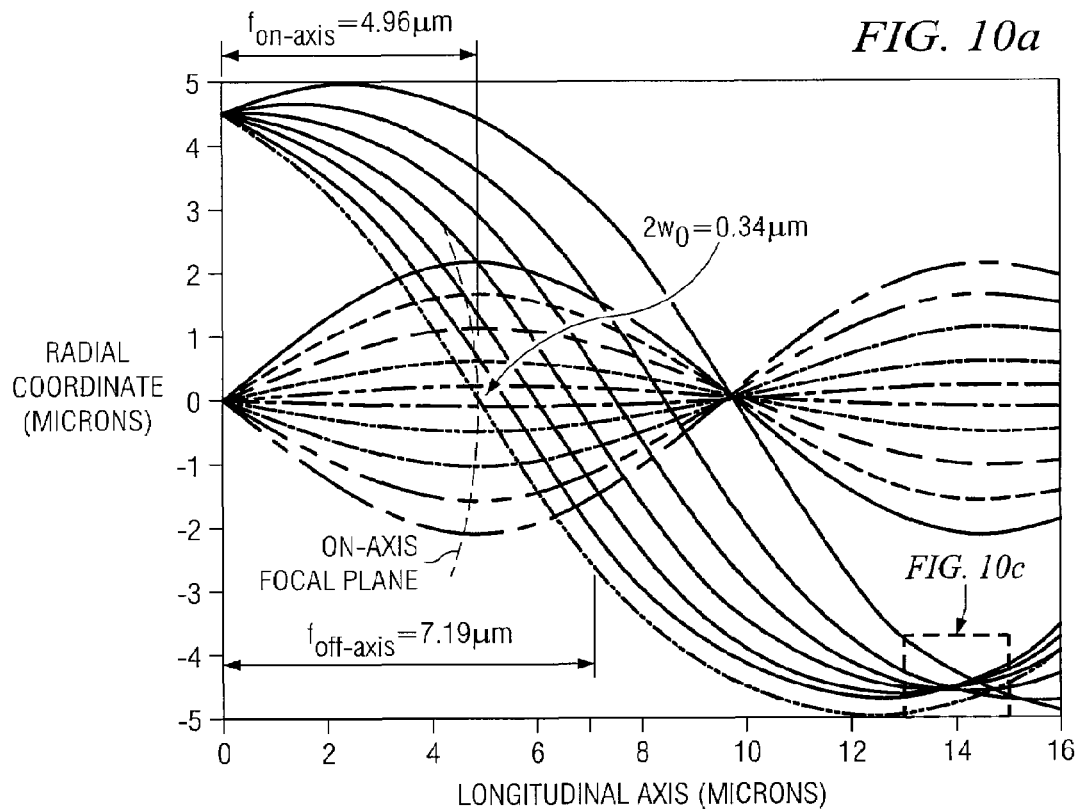
FIG. 10a is a diagram of simulated ray trajectories through the microstructured fibre of FIG. 9.
Figure 10B:
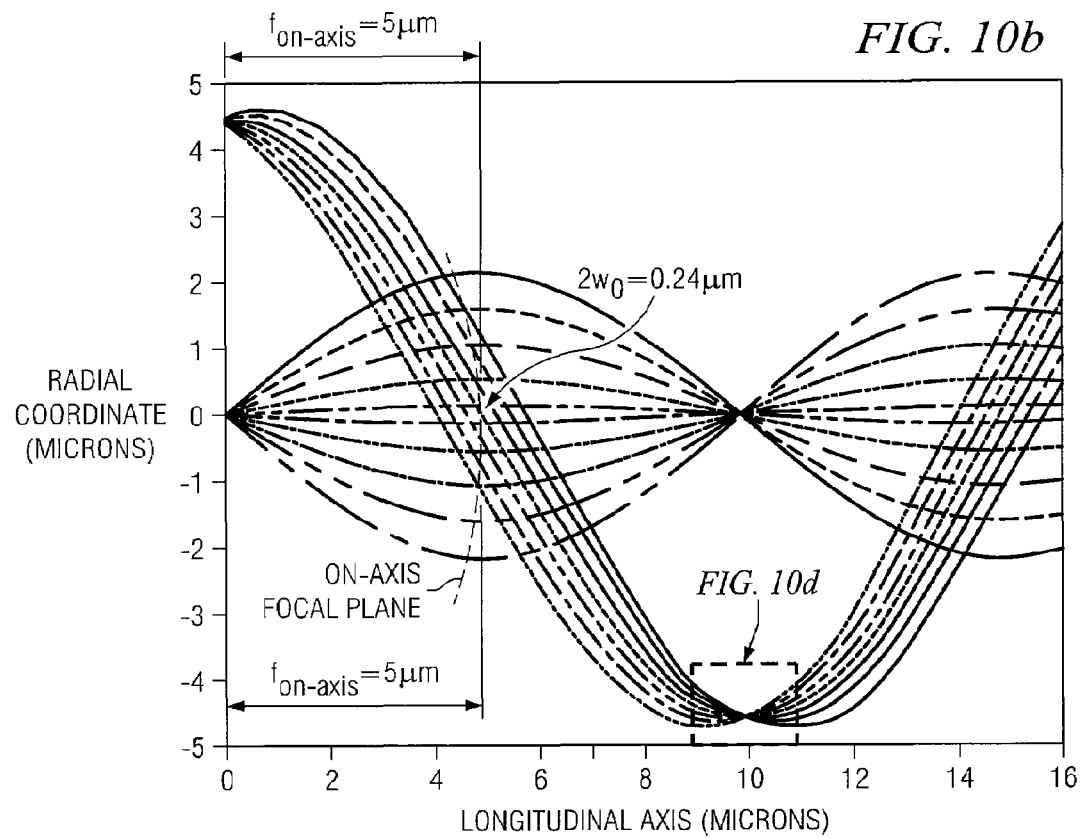
FIG. 10b is a diagram of simulated ray trajectories through an equivalent Gaussian graded index structure.
Figure 10C:
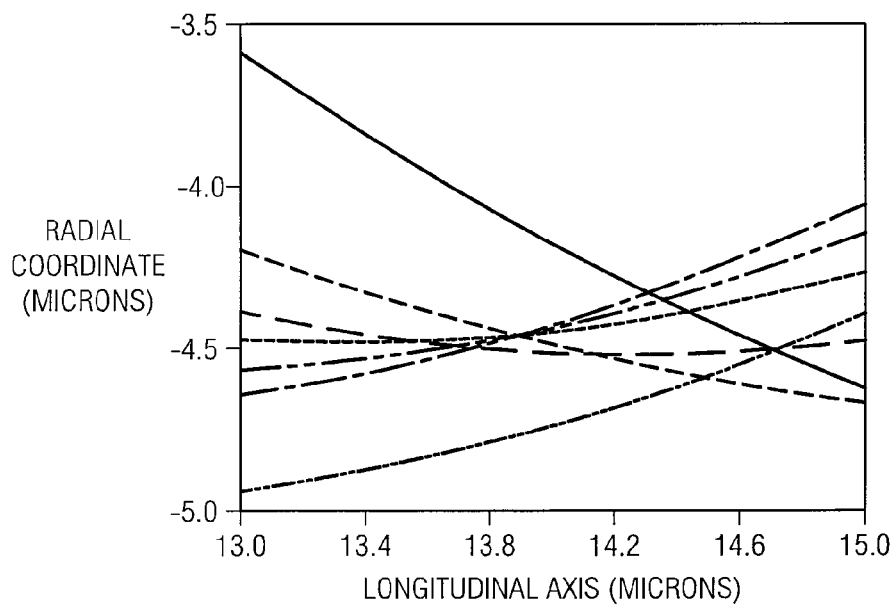
Figure 10D:
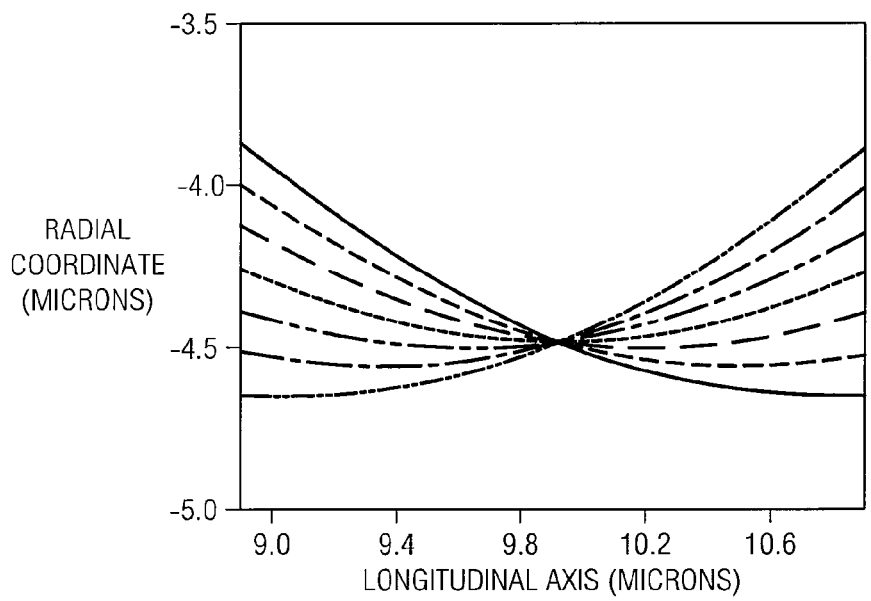
FIG. 10d is a magnified view of part of FIG. 10b.

Numerical simulation of the ray trajectories through the structure defined by the values given above gives the trajectories shown in FIG. 10a. The period (or focal length f) for on axis rays was the same as for an unzoned comparative example (same overall size with $n_1$=3.5 at the axis and $n_2$=1 at the outer radius), whose simulated rays are shown in FIG. 10b. Rays injected off-axis did not have the same focal length and as a group were poorly focussed (see FIG. 10c); the reasons for this are that the $\kappa_m$ values for the outer zones through which these rays pass were not optimally calculated. The focus of the on-axis rays was however close to ideal. The perfect focus of the unzoned comparative example is in accordance with equation (7) but again such a device would be difficult to fabricate because of its high refractive index contrast.

For the Gaussian zoned structure equation 7 shows that perfect sinusoid ray trajectories are possible. Substituting the parabolic zone structure defined by equations 1, 1a and 1b (for the first zone) into the ray trajectory equation 3a results in:

$$\frac{d^2 r}{dz^2} \approx \frac{-2(n_1 - n_2)N}{n_m(r) r_N^2} r \approx \frac{-2\Delta N}{r_N^2} r \quad (10)$$

Here $n_m(r)$ is not quite a constant but is not far off because zoning leads to a low refractive index contrast (i.e. $n_2 \approx n_1$) and so again sinusoids result. (Note that this equation gives a way of setting the focal length for the lens application of the parabolic zoned example since the spatial frequency of the sinusoidal ray trajectories will be: )

$$\kappa = \sqrt{\frac{2(n_1 - n_2)N}{n_m(r) r_N^2}} \approx \sqrt{\frac{2\Delta N}{r_N^2}} \quad (11)$$

The examples of the zoned microstructures given were for parabolic and Gaussian refractive index variation. The Taylor expansion of the Gaussian has terms in $r^2$ (quadratic i.e. parabolic), $r^4$, $r^6$ and so on, so there will be functions having, or having Taylor expansions having, the quadratic plus certain amounts of the higher order terms that will produce sinusoidal trajectories. These functions can be zoned using the procedures described above. Further examples of possible functions are the hyperbolic tangent function (tanh) and the hyperbolic secant function (sech).

Further, zoning of continuous refractive index profiles (not just the ones described above) for waveguiding gives the advantage that it reduces the refractive index contrast and so makes them easier to fabricate. Zoning will nonetheless maintain further properties of interest—e.g. interesting non-linear optical properties. The examples have been of refractive index functions that decrease monotonically within the zones, which is useful to refract rays back towards the axis. Using increasing functions would appear to direct rays away from the axis, which may be useful, for example, for constructing a diverging lens. Equally although the examples have shown the value of the refractive index on the axis to be high this is not essential.

In each of the structures discussed above all the zones have started at the same value of refractive index and all the zones have finished at the same value. This is not essential, however, the refractive index curve for each zone can be reduced in width or extended arbitrarily (its slope or κ having been determined) and the jump in refractive index at the zone boundary can also be determined arbitrarily. Adhering to the rule of constant upper and lower refractive indexes across the zones, however, keeps the overall refractive index contrast low, and is easier to fabricate.

Returning to the parabolic and Gaussian zoned microstructures in particular (and related profiles that produce sinusoidal trajectories), these structures can also be approximated to give broadly similar results. For example once the zone radii are determined for a particular profile (parabolic etc.) the gradation of refractive index in each zone could be approximated by a linear segment. However this may not be much easier to fabricate than the parabolic (etc.) variation itself.

Another approximation would be to have the refractive index constant within a zone (again the zone radii are determined using the parabolic (etc.) variation), but changing to a different value at the zone boundary. Preferably that would be one particular value for odd zones and another for even zones. Preferably the central zone would have the higher value, but it could have the lower value. An exemplary binary refractive index profile of a fibre with a higher refractive index in the central zone is given in FIG. 11. In particular this has zone boundaries according to equation (2).

Figure 11:
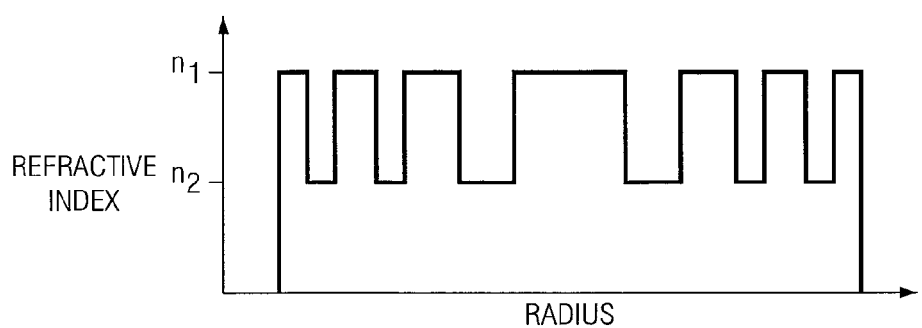
FIG. 11 is a zoned microstructure using materials of only two refractive indexes, where the refractive index of the central zone is higher than that of the zone outside of it.
Figure 12:
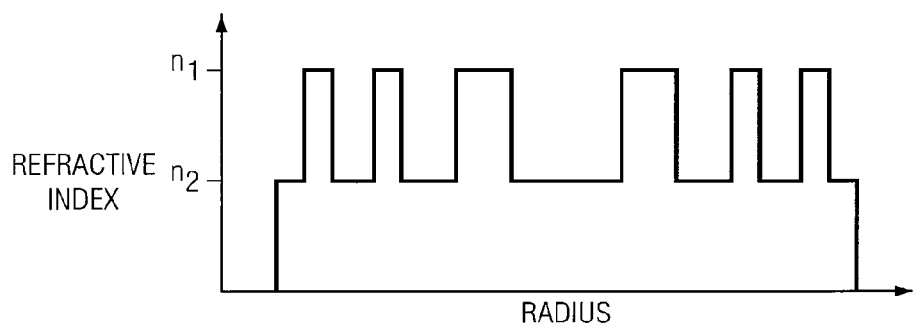
FIG. 12 is a zoned microstructure using materials of only two refractive indexes, where the refractive index of the central zone is lower than that of the zone outside of it.

An exemplary binary refractive index profile of a fibre with a lower refractive index in the central zone is given in FIG. 12, which have the inverse refractive index profile of the fibre shown in FIG. 11, i.e. it has the lower refractive index $n_2$ where FIG. 11 has the higher $n_1$ and vice versa.

Figure 13:
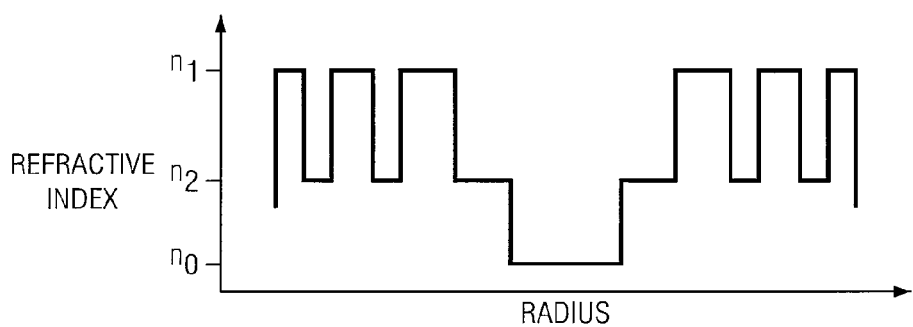
FIG. 13 is a zoned microstructure where the central zone is formed of a void, and the zones outside of the central zone are the same as shown in FIG. 11.
Figure 14:
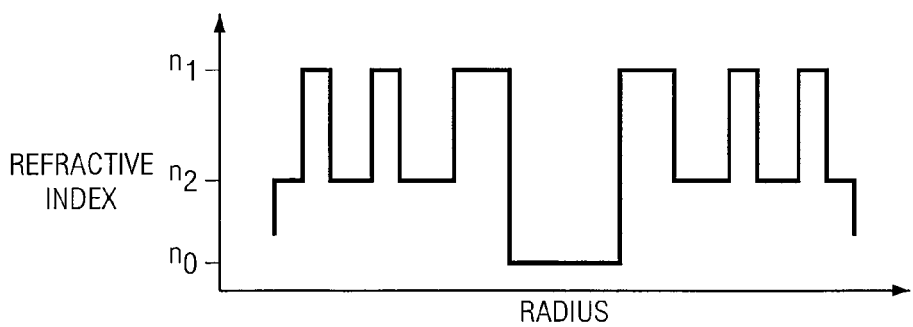
FIG. 14 is a zoned microstructure where the central zone is formed of a void, and the zones outside of the central zone are the same as shown in FIG. 12.

A particular type of fibre with a lower refractive index in the central zone is a hollow core fibre. FIGS. 13 and 14 show example zonal refractive index profiles of hollow core fibres with a binary refractive index profile in zones outside the central zone. These fibres employ refractive index profiles comparable to that of FIGS. 11 and 12 respectively, in the outer zones.

The core of this type of fibre may be filled (as is known in the art) with air; providing a reduced attenuation compared to solid core fibres due to reduced material absorption losses.

The core of hollow core fibres can also be filled with a microfluid, to enable the fibre to be used as sensor. The guiding properties of the fibre (for example absorption, degree of evanescence, modal field diameter) may then be influenced by the phenomena being sensed. The behaviour of the sensor can be defined by the material used to fill the central zone of the fibre.

Figure 15:
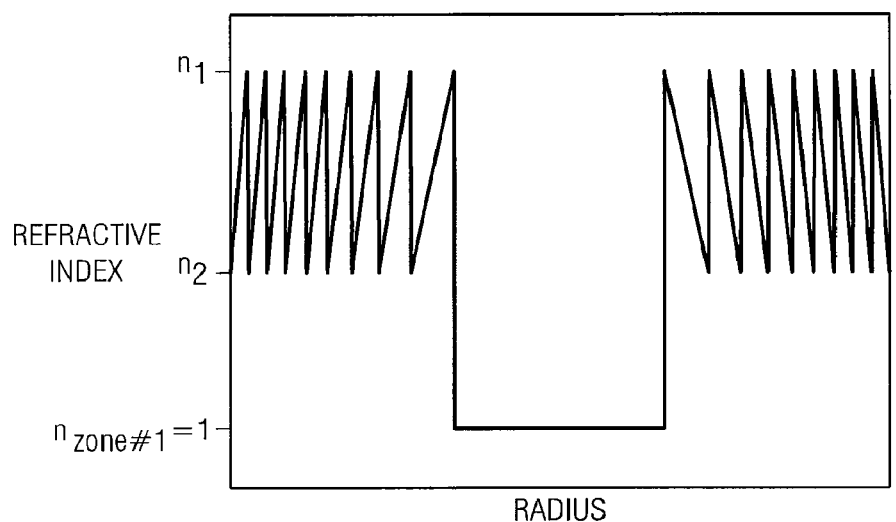
FIG. 15 is a zoned microstructure where the central zone is formed of a void, and the zones outside of the central zone are the same as shown in FIG. 6b.
Figure 16:
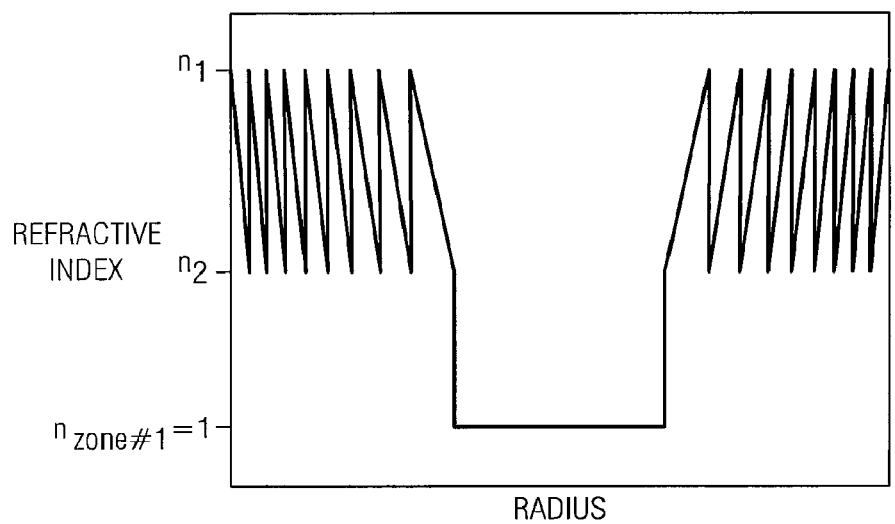
FIG. 16 is a zoned microstructure where the central zone is formed of a void, and the zones outside of the central zone are inverted versions of those shown in FIG. 6b.

FIG. 15 shows a further possible refractive index profile of a hollow core fibre. The zones outside the hollow core in this profile are those shown in FIG. 6b. A similar structure in which the outer zones are as FIG. 9b is also possible. FIG. 16 shows the refractive index of a fibre where the refractive index profile of the outer zones is an inverted version of that of the fibre shown in FIG. 15. Again an exponential variation as opposed to the parabolic is possible.

Figure 17:
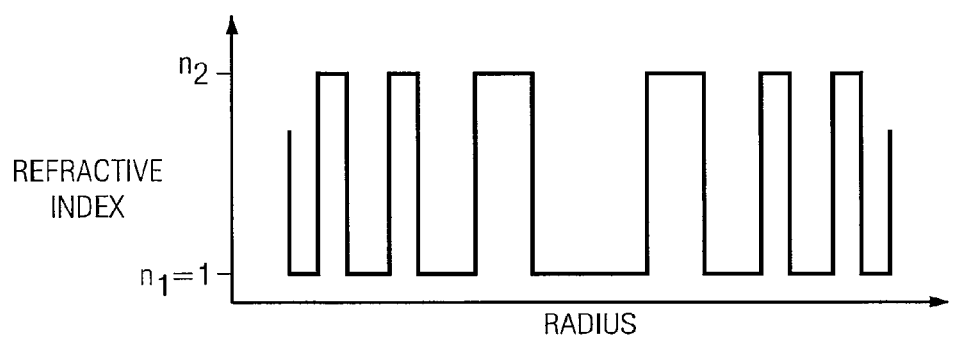
FIG. 17 is a zoned microstructure formed of alternating zones of optic material and voids.

FIG. 17 shows a binary hollow core fibre consisting of concentric rings of voids and glass zones. The voids may be filled with air or fluids as discussed above. For this type of fibre to be mechanically stable, support sections are required at intervals along the core to support the structure. Provided these support structures are small they do not significantly affect propagation of light along the fibre. Again, the inverse structure where the central zone has a refractive index of $n_2$ with the outer zones alternating between $n_1$ and $n_2$ ($n_1$ in the second zone) is possible.

All the structures above have been described as having cylindrical symmetry. This is not essential; for example in cross section the zones could be rectangular (including square) or elliptical and so on. Usually in these shapes the distances to the zones boundaries along any particular direction perpendicular to the optic axis will be in proportion to those along another such perpendicular direction.

Further, the examples described have been given for confinement of light in two dimensions (so that it can propagate along the remaining dimension). Similar devices in which the confinement is in one dimension and the light is free to propagate in the other two are also possible. The zones then comprise planes of optical material at distances from a central plane (as opposed to cylinders of material around a central axis as described above).

What is claimed is:

1. An optical device having an optic axis along which light propagates, the optical device comprising an optical material having a refractive index that changes continuously with distance from the optic axis except for at a plurality of discontinuities dividing the device into a plurality of zones, wherein the values of the refractive index at two or more of the discontinuities are substantially identical.

2. An optical device as claimed in claim 1 comprising a central zone that is bonded by a discontinuity nearest the optic axis, wherein the central zone is formed of a void.

3. An optical device as claimed in claim 2 wherein the void is filled with air.

4. An optical device as claimed in claim 2 wherein the void is filled with a microfluid.

5. An optical device as claimed in claim 1 arranged so that the trajectory of light rays in each zone is sinusoidal, or is a segment of a sinusoid.

6. An optical device as claimed in claim 5 wherein the periods of the ray trajectories in each zone are equal.

7. An optical device as claimed in claim 1 wherein the refractive index within each zone varies with distance from the optic axis according to a parabolic function.

8. An optical device as claimed in claim 7 wherein the parabolic function is centered on the optic axis.

9. An optical device as claimed in claim 1 wherein the refractive index within each zone varies in distance from the optic axis according to a function for the zone having, or having in its Taylor expansion, both a parabolic term and at least one higher order even term.

10. An optical device as claimed in claim 9 wherein the function is both even and centered on the optic axis.

11. An optical device as claimed in claim 1 wherein the refractive index within each zone varies with distance from the optic axis according to a Gaussian function.

12. An optical device as claimed in claim 11 wherein the Gaussian function is centered on the optic axis.

13. An optical device as claimed in claim 1 wherein the refractive index within each zone varies with distance from the optic axis according to a hyperbolic tangent function.

14. An optical device as claimed in claim 13 wherein the hyperbolic tangent function is centered on the optic axis.

15. An optical device as claimed in claim 1 wherein the refractive index within each zone varies with distance from the optic axis according to a hyperbolic secant function.

16. An optical device as claimed in claim 15 wherein the hyperbolic secant function is centered on the optic axis.

17. An optical device as claimed in claim 1 wherein the zones defined by the discontinuities are rectangular in cross section perpendicular to the optic axis.

18. An optical device as claimed in claim 17 wherein the zones defined by the discontinuities are square in cross section perpendicular to the optic axis.

19. An optical device as claimed in claim 1 wherein there are five or more of the discontinuities.

20. An optical device as claimed in claim 1 wherein there are ten or more of the discontinuities.

21. An optical device as claimed in claim 1 wherein one or more of the zones are bounded by two discontinuities and wherein the refractive index within each such zone decreases monotonically with distance from the optic axis.

22. An optical device as claimed in claim 1 wherein one or more of the zones are bounded by two discontinuities and wherein the refractive index within each such zone increases monotonically with distance from the optic axis.

23. An optical device as claimed in claim 1 wherein a plurality of the zones are bounded by two discontinuities and wherein the values of the refractive index at the discontinuity of each such zone nearer to the optic axis are substantially identical.

24. An optical device as claimed in claim 1 wherein a plurality of the zones are bounded by two discontinuities and wherein the values of the refractive index at the discontinuity of each such zone further from the optic axis are substantially identical.

25. An optical device as claimed in claim 1 wherein at each of the discontinuities the refractive index decreases in the direction of increasing distance from the optic axis.

26. An optical device as claimed in claim 1 wherein at each of the discontinuities the refractive index increases in the direction of increasing distance from the optic axis.

27. An optical device as claimed in claim 1 arranged so that the trajectory of the light rays oscillates about the optic axis.

28. An optical device as claimed in claim 1 arranged so that the trajectory of the light rays through the complete device is sinusoidal.

29. An optical device as claimed in claim 1 comprising a central zone that is bounded by the discontinuity nearest the optic axis, wherein the refractive index of the central zone decreases monotonically with distance from the optic axis.

30. An optical device as claimed in claim 1 comprising a central zone that is bounded by the discontinuity nearest the optic axis, wherein the refractive index of the central zone increases monotonically with distance from the optic axis.

31. An optical device as claimed in claim 1 comprising a central zone that is bounded by a discontinuity nearest the optic axis, wherein the value of the refractive index of the central zone is constant with distance from the optic axis and less than the lowest value of the refractive index of the neighbouring zone.

32. An optical device as claimed in claim 1 comprising a central zone that is bounded by a discontinuity nearest the optic axis, wherein the value of the refractive index of the central zone is less than the lowest value of the refractive index of all the other zones.

33. An optical device as claimed in claim 1 wherein the optical device is a waveguide.

34. An optical device as claimed in claim 1 wherein the optical device is a lens.

35. An optical device as claimed in claim 1 wherein the optical device is a sensor.

36. An optical device as claimed in claim 1, wherein the optic axis is a plane and the zones and the discontinuities that define them are parallel to that plane.

37. An optical device as claimed in claim 1 wherein the zones defined by the discontinuities are circular in cross section perpendicular to the optic axis.

38. An optical device as claimed in claim 1 comprising a central zone that is bonded by a discontinuity nearest the optic axis, wherein the value of the refractive index of the central zone is equal to 1.

39. An optical device as claimed in claim 1 wherein the zones defined by the discontinuities are elliptical in cross section perpendicular to the optic axis.

40. A method of manufacturing an optical device comprising
designing a first device according to claim 1 to determine the positions of the discontinuities that divide the zones; and
making a second optical device having optic axis along which light propagates, the second device comprising optical material and having discontinuities in the refractive index in the same positions as those of the design of the first device.

41. A method as claimed in claim 40 wherein within each of the said zones the refractive index is constant.

42. A method as claimed in claim 41 wherein the value of the refractive index of the each zone alternately increases and decreases from one zone to the next.

43. A method as claimed in claim 42 wherein the value of the refractive index of each zone alternates between particular first and second values from one zone to the next.

44. A method as claimed in claim 42 wherein the refractive index of a central zone that is bounded by the discontinuity nearest the optic axis is higher than that of the next zone outside the central zone.

45. A method as claimed in claim 42 wherein the refractive index of a central zone that is bounded by the discontinuity nearest the optic axis is lower than that of the next zone outside the central zone.

46. A method as claimed in claim 41 wherein the refractive index of a central zone that is bounded by the discontinuity nearest the optic axis is less than the value of the refractive index of all zones outside of the central zone.

47. A method as claimed in claim 46 wherein the refractive index of the central zone is equal to 1.

48. A method as claimed in claim 40 wherein alternate zones are formed of voids.

49. A method as claimed in claim 48 wherein the voids are filled with air.

50. A method as claimed in claim 48 wherein the voids are filled with a microfluid.

51. A method as claimed in claim 40 wherein the central zone is formed of a void.

52. A method as claimed in claim 51 wherein the void is filled with air.

53. A method as claimed in claim 51 wherein the void is filled with a microfluid.

54. A method as claimed in claim 40 wherein, for the second device, for all of the zones that are bounded by two discontinuities the values of the refractive index at the discontinuity nearer to the optic axis are the same as each other.

55. A method as claimed in claim 40 wherein, for the second device, for all of the zones that are bounded by two discontinuities the values of the refractive index at the discontinuity further from the optic axis are the same as each other.

56. A method as claimed in claim 40 wherein in the second device within each zone the refractive index varies linearly.

57. An optical device made according to the method of claim 40.

* * * * *

UNITED STATES PATENT AND TRADEMARK OFFICE
CERTIFICATE OF CORRECTION

PATENT NO.         : 7,110,649 B2                                     Page 1 of 1
APPLICATION NO. : 10/887114
DATED              : September 19, 2006
INVENTOR(S)        : Makiko Hisatomi et al.

It is certified that error appears in the above-identified patent and that said Letters Patent is hereby corrected as shown below:

Column 1, Line 10, after "STRUCTURED" delete "FIBER" and insert -- FIBRE --.
Column 4, Line 26, after "where" delete "n(x)" and insert -- n($\underline{x}$) --.
Column 4, Line 26, after "point" delete "x" and insert -- $\underline{x}$ --.

Signed and Sealed this

Twenty-first Day of April, 2009

JOHN DOLL
*Acting Director of the United States Patent and Trademark Office*